Nov. 12, 1940.  F. S. BARKS ET AL  2,221,566
REEL
Filed July 18, 1938   3 Sheets-Sheet 2

Frank S. Barks,
Alexander P. Fox,
Ludwin C. Rotter,
William Z. Linders,
Inventors.
Delos G. Haynes,
Attorney.

Nov. 12, 1940. F. S. BARKS ET AL 2,221,566
REEL
Filed July 18, 1938 3 Sheets-Sheet 3
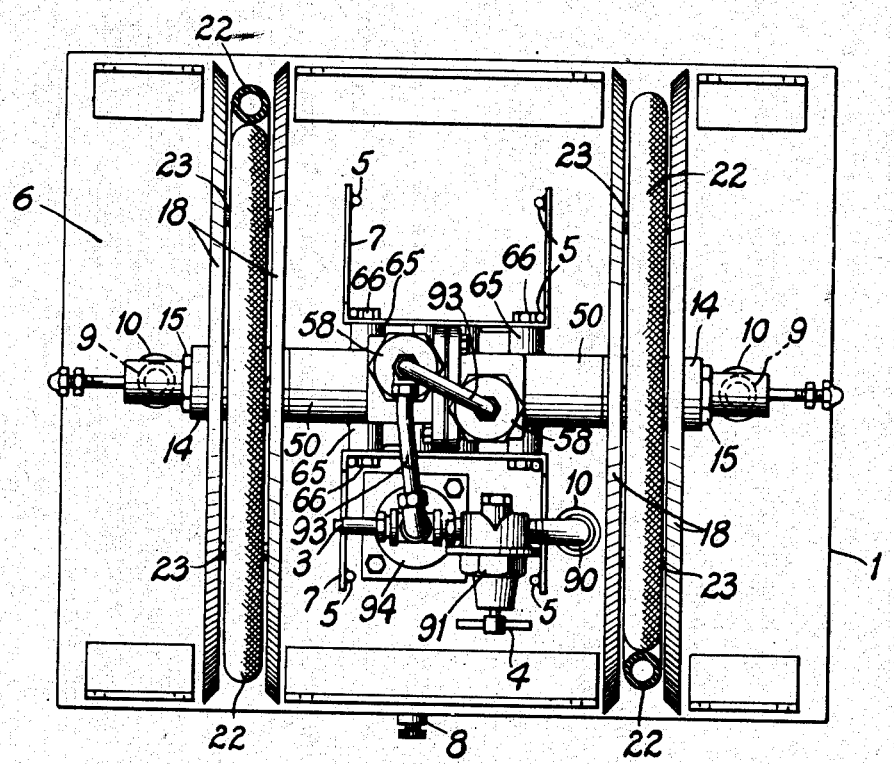
FIG. 4.
FIG. 5.
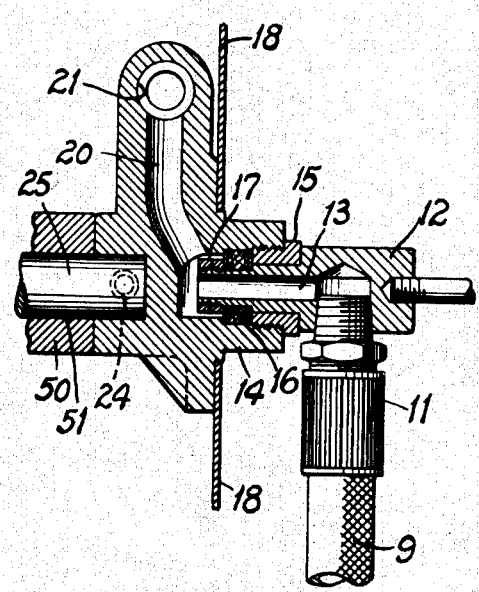
FIG. 6.
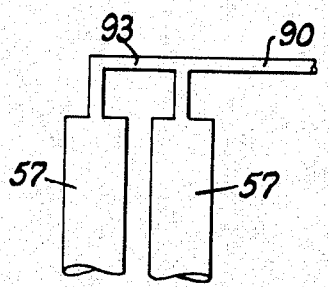
Frank S. Barks,
Alexander P. Fox,
Ludwin C. Rotter,
William Z. Linders,
Inventors.
Delos G. Haynes,
Attorney.

Patented Nov. 12, 1940

2,221,566

UNITED STATES PATENT OFFICE 2,221,566

REEL

Frank S. Barks, St. Louis, Alexander P. Fox, University City, Lutwin C. Rotter, Maplewood, and William Z. Linders, Ferguson, Mo., assignors to Lincoln Engineering Company, St. Louis, Mo., a corporation of Missouri Application July 18, 1938, Serial No. 219,686

4 Claims. (Cl. 242—86)

This invention relates to reels, and with regard to certain more specific features, to retrieving reels.

Among the several objects of the invention may be noted the provision of a compact and portable reel for automatically retrieving flexible lines such as lubricant lines or air-hose lines, electric lines and the like; the provision of apparatus of the class described in which the maximum retrieving force is smaller than is practicable with spring-retrieved apparatus of this class; and the provision of apparatus of the class described which is simple in form and is dependable. Other objects will be in part obvious and in part pointed out hereinafter.

The invention accordingly comprises the elements and combinations of elements, features of construction, and arrangements of parts which will be exemplified in the structures hereinafter described, and the scope of the application of which will be indicated in the following claims.

In the accompanying drawings, in which are shown several of various possible embodiments of the invention, Fig. 1 is a front elevation, parts being broken away and indicated in vertical section, one hose being shown partially unwound;

Fig. 4 is a plan view of the apparatus with covers removed;

Fig. 5 is an enlarged vertical section taken on line 5—5 of Fig. 2; and,

Fig. 6 is a diagrammatic view of a modification without a regulator or accumulator in the piping system.

Similar reference characters indicate corresponding parts throughout the several views of the drawings.

Hose reels in which fluid pressure is communicated to a hose line through a central packed hub are shown, for example, in United States Patents 1,244,818, 1,659,788 and 2,039,250. Retrieving reels which depend upon ordinary springs for their returning action are subject to the operation of Hooke's law, that is, the more the line is withdrawn, the more a spring is tensioned in direct proportion, so that the withdrawn line is increasingly tensioned and becomes less flexible and more difficult to manipulate at the greater extensions.

One form of reel overcomes the above difficulty by eliminating springs and by looping the line around a weighted pulley. In this case, the return force is supplied by gravity instead of by a spring. This gravity force is substantially constant for the various elevations assumed by the weighted pulley. Such gravity reels are subject to the disadvantages that they are not portable and that they require excessive space.

The present invention approximates the advantageous operation of the gravity retrieving system without the disadvantage of its space-consuming characteristics, and with the added advantage of portability. While it is possible to construct spring-retrieved systems with pre-compressed springs in which there is a small ratio of retrieving force before and after line extension, these require an excessively large force over the entire range of line extension, or mechanical complications, which are insurmountable. The present invention provides a simplified means for reducing the maximum pressure involved in retrieving the line.

Figure 1:
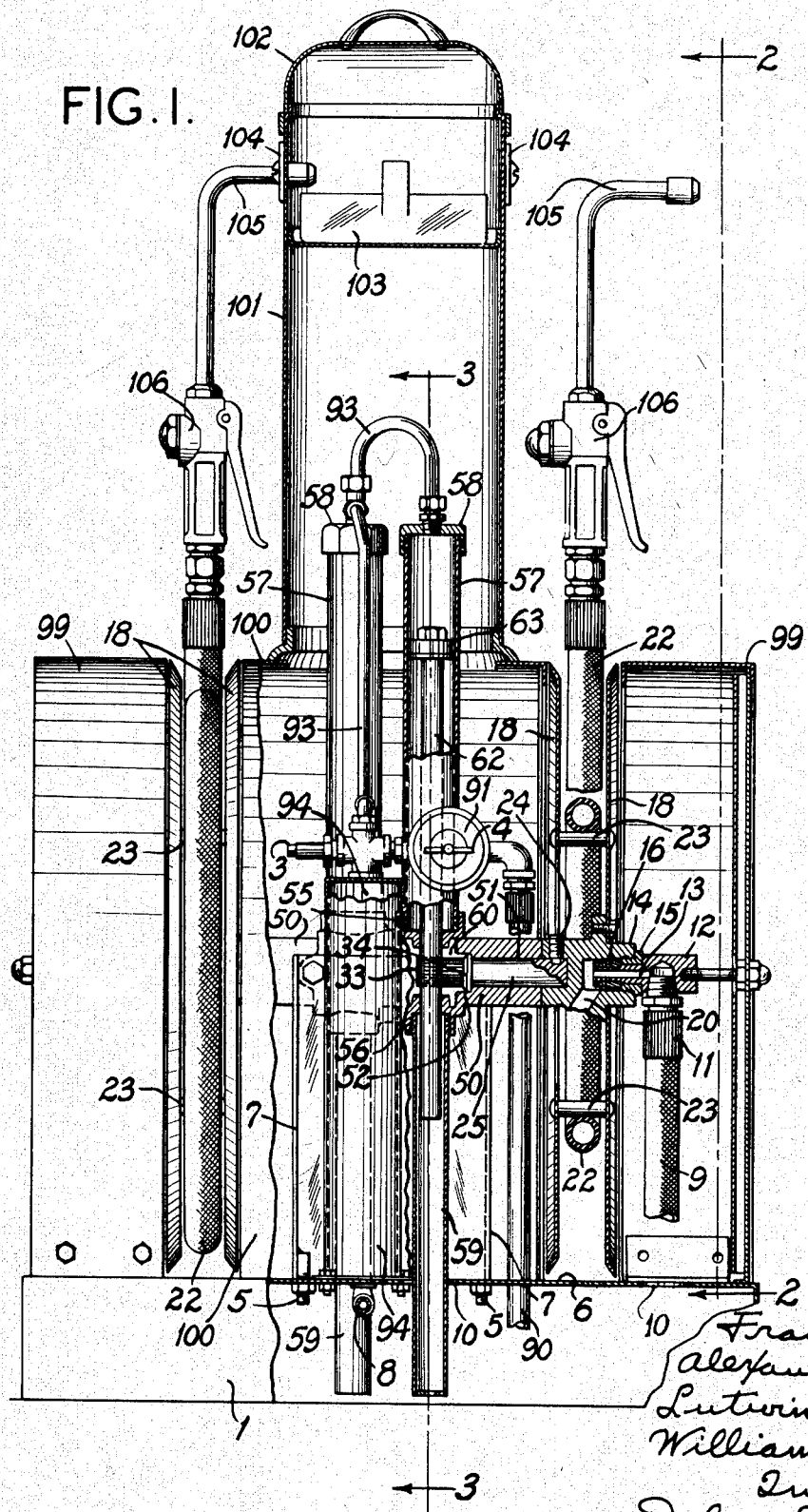
Figure 2:
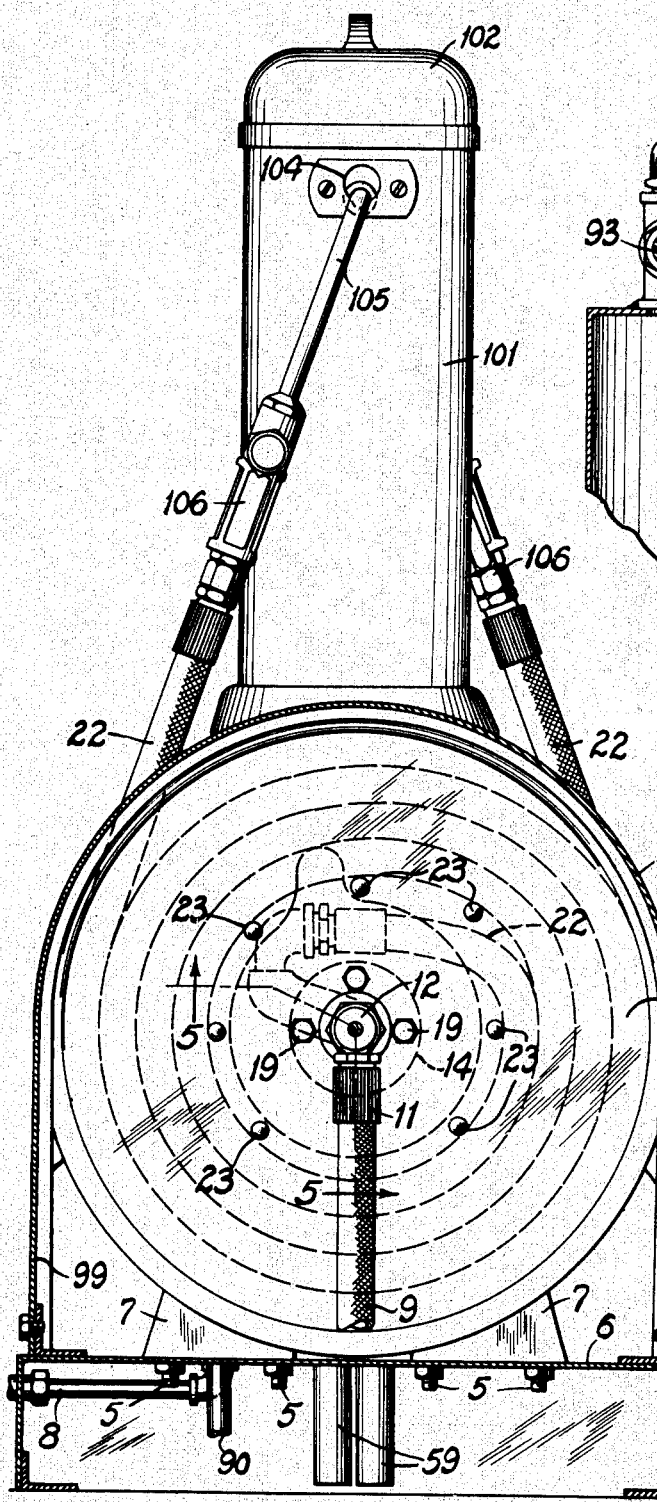
Fig. 2 is a vertical section taken substantially on line 2—2 of Fig. 1, but each hose is shown as being wound.

Referring now more particularly to Fig. 1 of the drawings, numeral 1 indicates a suitable base having an upper flat surface 6. Openings 10 are provided in the surface 6 to accommodate supply lines 9 and 90 for lubricant and air respectively.

On the base 1 are two similar reels, but, for brevity, one reel and its elements will be described. Lubricant supply line 9 is attached by means of the fitting 11 to a stationary body 12 of a swivel (Fig. 5). The body 12 is hollow, as indicated at 13. The body 12 communicates with the reel hub casting 14 through a gland 15, which includes packing 16 and shoulder-forming means 17 to form a fluid-tight swivel joint. Other swivelling means may be used, such as shown, for example, in Fox United States Patent 2,083,599.

Hub casting 14 is attached to reel discs 18 by bolts 19. The discs 18 are spaced by suitable spacing pillars 23 which also form an inner hose supporting means (Fig. 1). A fluid passage 20 communicates at its inner end with the passage 13 in body 12, and extends outwardly to a threaded opening 21 which accommodates a suitable hose fitting of hose 22.

The inner end of hub 14 is bored coaxially with body 12 to receive one end of a pinion shaft 25 which is fastened thereto by a pin 24, so as to rotate with the hub casting.

A housing 50 forms a bearing for the assembly of hub casting 14 and its extending pinion shaft 25. The housing 50 has an enlarged chamber 60 and a reduced bore 51 to form the bearing.

A pinion 33 is arranged in the chamber 60 and has a collar 34 which seats in an enlarged offset 52 intermediate bores 51 and 60. The collar 34 acts as a bearing preventing longitudinal movement in one direction of the pinion. Longitudinal movement in the opposite direction is prevented by the hub casting 14.

Figure 3:
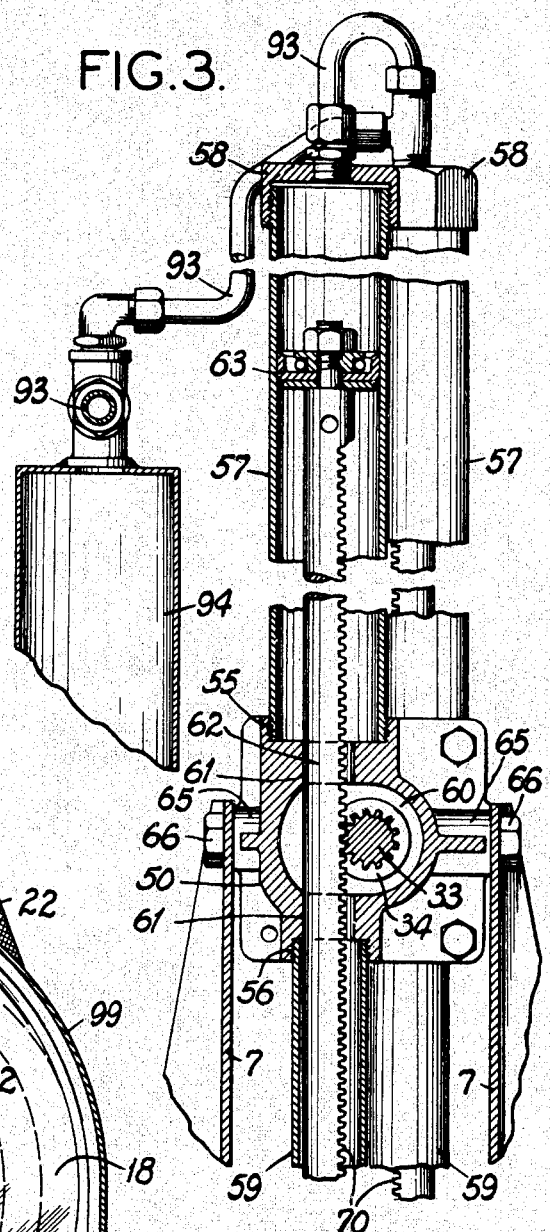
Fig. 3 is an enlarged vertical section taken on line 3—3 of Fig. 1 with parts broken away.

The housing 50, adjacent its pinion-containing portion, has a pair of vertically aligned threaded openings 55 and 56, the axes of which are at right angles to the axis of the pinion 33 (Fig. 3). The opening 55 receives a cylinder 57 which has a suitable cap 58. The lower opening 56 receives a cylinder 59, which is also capped in order to hold oil that will carry up on rack teeth 70. Bores 61 provide guide bearings for a piston rod 62. On the upper end of rod 62 is provided a suitable air-tight piston 63 which reciprocates in cylinder 57. Piston rod 62 is provided with rack teeth 70 to coact with the teeth on pinion 33.

The casting 50 is secured in a horizontal position between pedestals 7 by bosses 65 and bolts 66. Pedestals 7 are rigidly secured to base 1 by bolts 5.

Beyond the air supply line 90 is an adjustable, pressure-reducing, regulating valve 91 which communicates with conduits 93. Conduits 93 interconnect the working cylinders 57 and an auxiliary reservoir or accumulator 94, the latter being secured to base 1. These parts 93, 57 and 94 make a single pressure manifold. If accumulator 94 is not used, then ports 93 and 57 constitute a single pressure manifold. This valve includes a manual control 4 whereby the pressure admitted may be adjusted and thereafter automatically maintained at any adjusted value.

End covers 99 are secured in position on base 1. The end covers 99 follow the circular contours of the flanges 18 quite closely so that a flush relationship is presented. A rounded center cover 100 is provided with a stack 101 which has a removable cap 102 to facilitate the removal of a drip pan 103. Stack 101 is provided with bayonet openings 104 to receive and support the nozzles 105 of control valves 106 when the valves are not in use. Suitable control valves are located on hoses 22.

In general practice, super-atmospheric air supply pressure is normally available from an air pump operating in conjunction with an air receiver or pressure tank (not shown). Line 90 proceeds from such a receiver and supplies air to line 93 through the regulator 91.

The auxiliary receiver 94 provides space beyond the regulator 91 for compressing the working air of cylinders 57. Regulator valve 91, as is known, allows no air to return to supply line 90.

The operation of the device is as follows:

The fluid grease under pressure from supply line 9 follows through the longitudinal bore 13 in swivel body 12 up through the internally cored passage 20 in hub casting 14 to the hose 22.

The regulator valve 91 is set to admit the desired super-atmospheric pressure into the cylinders 57 and reservoir 94, with both hoses in retracted position on the reels. Each piston 63 is then at its lowest position, that is, of maximum volume in its respective cylinder 57.

Nozzle 105 of control valve 106 is removed from stack 101 and hose 22 is pulled out the required distance. As the hose 22 is extended it unwinds and revolves reel discs 18. Pinion shaft 25 and pinion 33 revolve with hub casting 14, thereby elevating the respective piston 63. This movement compresses the air in cylinder 57 and reservoir 94. The air thus compressed exerts sufficient force to retrieve the hose when the latter is released.

Since, at a constant temperature, the pressure in a contained space is inversely proportional to its volume, the greatest retrieving pressure is obtained at the greatest hose extension. In order to reduce the final retrieving pressure, the added volume in chamber 94 is used. This is because the regulator 91 cuts off the connection to the pump receiver (pressure tank) except for periods of intermittent flow from its high-pressure to its low-pressure side. By increasing the volume connected with the lines 93, the ratio of volume change is closer to unity than if the increased volume provided by chamber 94 were not used. This means that the inverse pressure ratio is also closer to unity, that is, the final pressure is closer to the initial pressure and thus the maximum is lower. Hence, the difference between the initial retrieving tension on the hose and the final retrieving tension when pulled out is less. The larger the auxiliary receiver 94, the more is approached the condition of a constant retrieving pressure. For example, an ideal, infinite volume connected with cylinders 57 would result in constant initial pressure throughout the stroke of either piston 63.

Some air compressor and pressure tank outfits provide such a pressure that the pressure-reducing regulator 91 may be dispensed with, as diagrammatically indicated in Fig. 6. In this event, the auxiliary receiver 94 may also be dispensed with, also as indicated in Fig. 6. This is because the tank between the compressor and line 90 functions as a receiver to increase the volume in communication with cylinders 57, enough so that the volume change in a cylinder 57 is relatively small compared to the total volume involved in the compression process.

But, even in the absence of a regulator valve 91, the accumulator 94 may be useful and can, if desired, be used. For example, if the line 90 from the compressor tank is small or long or both, the friction therein may act as a throttle temporarily to prevent free flow between cylinders 57 and the pressure tank, in which event, the volume of the pressure tank would not be useful under working conditions to reduce the rate at which pressure fills up in the cylinders 57. The connection between the accumulator 94 and the cylinders 57 is so short that substantial friction throttling is not introduced.

It is intended that the total volume of the piping associated with the respective cylinders 57 and that of the accumulator 94 shall be substantially greater than the volumetric displacement of either piston 63. Where no accumulator 94 is used, it is intended that the total volume of the piping from the cylinders 57 to and including the compressor tank shall be substantially greater than the volumetric displacement of either piston 63.

The external source of compressed air provides for a pressure after the completion of the expansion stroke of each piston which is above atmospheric pressure, thus providing against the reduction of the retrieving tension to zero (atmospheric) at the end of the working stroke. In cases where positively sealed displacement apparatus is used instead of the piston (such as for example a metallic bellows, rubber diaphragm, or the like), the external source of super-atmospheric pressure may not be necessary, except possibly for initial charging purposes. For example, such apparatus may be charged with a super-atmospheric pressure during manufacture and, without leakage, will operate to provide a super-atmospheric pressure throughout the stroke of operation.

The usual auxiliary apparatus is used such as a safety relief valve 3 and drain 8 for the accumulator 94.

It is to be understood that the parts subject to air compression from the pistons or movable pressure-receiving means 63 may be considered as chamber-forming means.

In view of the above, it will be seen that the several objects of the invention are achieved and other advantageous results attained.

As many changes could be made in carrying out the above constructions without departing from the scope of the invention, it is intended that all matter contained in the above description or shown in the accompanying drawings shall be interpreted as illustrative and not in a limiting sense.

We claim:

1. A reel comprising a rotary support for a line to be extended, said support being rotated as the line is extended, chamber-forming means containing a volume of fluid continuously under super-atmospheric pressure, movable pressure-receiving means exposed continuously to the pressure of said fluid, means operatively connecting the rotary support and the pressure-receiving means whereby the latter is moved according to the rotation of the support, a pressure supply means to provide a pressure higher than that necessary in the chamber-forming means, and a regulating valve for admitting fluid from the pressure supply to the chamber-forming means at a substantially predetermined minimum pressure in the chamber-forming means, said regulator valve preventing flow from the chamber-forming means back to the supply.

2. A reel comprising a rotary support for a line to be extended, said support being rotated as the line is extended, a chamber-forming means containing a volume of fluid continuously under super-atmospheric pressure, movable pressure-receiving means exposed continuously to the pressure of said fluid, means operatively connecting the rotary support and the pressure-receiving means whereby the latter is moved according to the rotation of the support, a pressure-supply means to provide a pressure higher than that necessary in the chamber-forming means, and a regulating valve for admitting fluid from the pressure supply to the chamber-forming means at a substantially predetermined minimum pressure in the chamber-forming means, said regulator valve preventing flow from the chamber-forming means to the supply, the volume of said chamber-forming means being substantially greater than the volumetric displacement of said pressure-receiving means.

3. A reel comprising a plurality of rotary supports for lines to be extended, the respective supports being rotated as the respective lines are extended, a single manifold containing a volume of fluid continuously under super-atmospheric pressure, a plurality of movable pressure-receiving means in said single manifold, each pressure-receiving means being exposed continuously to the substantially super-atmospheric pressure of said fluid, respective means operatively connecting the respective rotary supports and the respective pressure-receiving means whereby the latter are respectively moved according to the respective rotary movements of the supports, pressure-supply means to provide a pressure higher than that necessary in the manifold, and at least one regulating valve for admitting fluid from the pressure supply to the manifold at a substantially predetermined minimum pressure in the manifold, said regulating valve preventing flow from the manifold to the supply.

4. A reel comprising a plurality of rotary supports for lines to be extended, the respective supports being rotated as the respective lines are extended, a pressure manifold containing a volume of fluid continuously under super-atmospheric pressure, a plurality of movable pressure-receiving means in said single manifold, each pressure-receiving means being exposed continuously to the substantially super-atmospheric pressure of said fluid, respective means operatively connecting the respective rotary supports and the respective pressure-receiving means whereby the latter are respectively moved according to the respective rotary movements of the supports, pressure-supply means to provide a pressure higher than that necessary in the manifold, at least one regulating valve for admitting fluid from the pressure supply to the manifold at a substantially predetermined minimum pressure in the manifold, said regulating valve preventing flow from the manifold to the supply, and an accumulator communicating with the manifold.

FRANK S. BARKS.
ALEXANDER P. FOX.
LUTWIN C. ROTTER.
WILLIAM Z. LINDERS.